(No Model.)
A. F. JONES.
MACHINE FOR CUTTING TANBARK.
No. 474,745. Patented May 10, 1892.
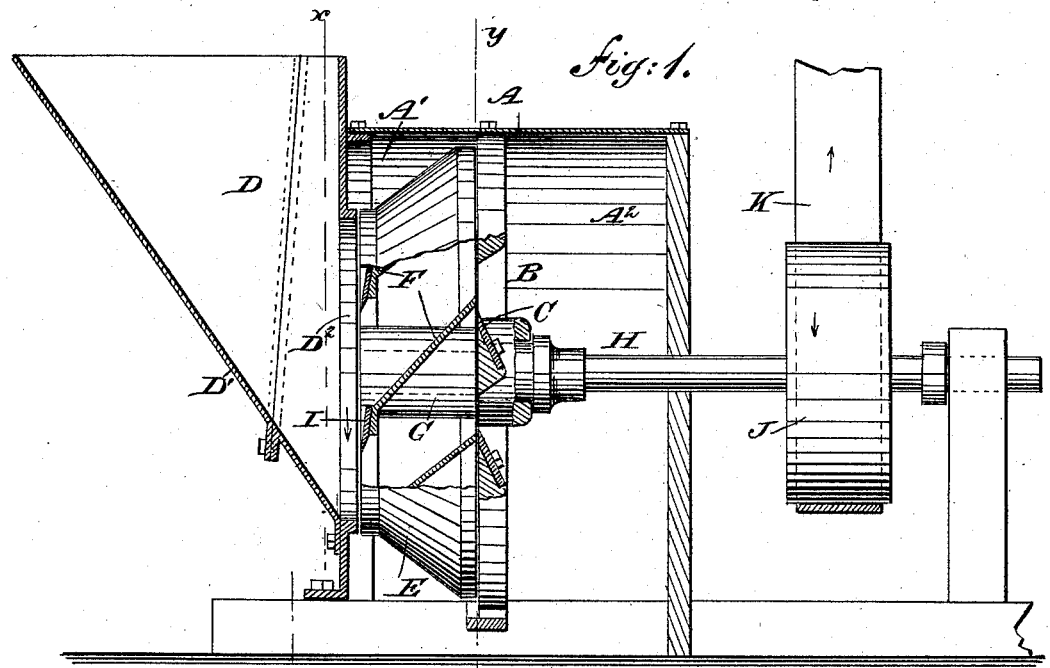

UNITED STATES PATENT OFFICE.

ALBERT F. JONES, OF SALEM, MASSACHUSETTS.

MACHINE FOR CUTTING TANBARK.

SPECIFICATION forming part of Letters Patent No. 474,745, dated May 10, 1892.

Application filed July 21, 1891. Serial No. 400,215. (No model.)

*To all whom it may concern:*

Be it known that I, ALBERT F. JONES, of Salem, in the county of Essex and State of Massachusetts, have invented a new and Improved Machine for Cutting Tanbark, of which the following is a full, clear, and exact description.

The object of the invention is to provide a new and improved cutting-machine which is simple and durable in construction, very effective in operation, and more especially designed for rapidly reducing tanbark.

The invention consists of a rotary wheel provided with knives and wings forming a feed for fixed knives.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is a transverse section of the same on the line $x\ x$ of Fig. 1, and Fig. 3 is a similar view of the same on the line $y\ y$ of Fig. 1.

The improved cutting-machine is provided with a casing A, having a transverse open web B, dividing the casing A into a front compartment A' and a rear or discharge compartment A². On the spokes of the web B are secured knives C, slightly inclined, as is plainly shown in Fig. 1, the cutting-edges of the knives extending to the front of the web. On the front compartment A' of the casing A is arranged a hopper D, into which the bark to be cut is introduced. The hopper D is formed with an inclined bottom D', and in its vertical inner wall with a circular opening D², leading into the small end of a conical wheel E, formed with radial wings F, set spirally on a hub G, fastened on the shaft H, mounted to turn in suitable bearings and extending longitudinally and centrally through the casing A.

In the front or small end of the conical wheel E are arranged knives I, fastened to the front ends of the wings F, as is plainly shown in Figs. 1 and 2. The cutting-edges of the knives I extend close to the opening D² of the hopper D, so that the material passing down the hopper is cut into long strips by the knives, which latter force the strips inward into the conical wheel E between the wings F. The latter crowd the cut strips rearward, so that the strips are brought in contact with the fixed knives C, whereby the bark is reduced to small pieces, which fall into the compartment A², open at the bottom to discharge the cut tanbark.

The shaft H is provided with a pulley J, connected by a belt K with suitable machinery for imparting a rotary motion to the said shaft H. The shaft, as previously mentioned, carries the wheel E, which rotates in the direction of the arrow $a'$. (Indicated in Fig. 2.) The knives I are held adjustably on the ends of the wings F, so as to compensate for wear and grinding.

It is understood that the strips cut by the knives I follow the angular arrangement of the wings F, so as to be chopped up in small pieces when coming in contact with the stationary knives C. It is further understood that the strips cut by the knives I are carried around within the wheel E, and are thus brought in contact with successive knives C on the web B.

Having thus described my invention, I claim as new and desire to secure by Letters Patent—

1. In a machine for cutting tanbark, the combination, with fixed knives, of a rotary wheel provided with angular wings forming a feed for the said fixed knives, substantially as shown and described.

2. In a machine for cutting tanbark, the combination, with a hopper, of a rotary wheel provided with knives and into which discharges the said hopper, angular wings held on the said wheel, and fixed knives upon which discharge the said wings, substantially as shown and described.

3. In a machine for cutting tanbark, the combination, with a casing provided with transverse web supporting knives, of a hopper arranged on the front end of the said casing, a wheel mounted to turn within the casing between the said hopper and the said web, the said wheel being provided at its front end with knives for cutting the material into strips, and wings held on the said wheel and forming a feed for the said fixed knives on the web, substantially as shown and described.

4. In a machine for cutting tanbark, a rotary wheel having a conical rim, angular wings arranged between the rim and hub of the said wheel, and knives secured to the front ends of the said wings, substantially as shown and described.

5. In a machine for cutting tanbark, a rotary wheel having a conical rim, angular wings arranged between the rim and hub of the said wheel, and knives secured to the front ends of the said wings, in combination with a hopper discharging onto the said knives, and fixed knives arranged at the rear end of the said wheel and onto which the strips are fed by the said wings, substantially as shown and described.

ALBERT F. JONES.

Witnesses:
HENRY P. SUTTON,
JOHN BRODERICK.